United States Patent
Wassmer et al.

(10) Patent No.: US 9,441,094 B2
(45) Date of Patent: Sep. 13, 2016

(54) EASILY PREPARABLE, REDUCED-VOC, ENVIRONMENTALLY FRIENDLY (METH)ACRYLAMIDO-FUNCTIONAL SILOXANE SYSTEMS, PROCESS FOR PREPARATION THEREOF AND USE

(71) Applicants: Christian Wassmer, Hausen (DE); Burkhard Standke, Loerrach (DE); Thomas Schlosser, Inzlingen (DE); Regina Krause, Rheinfelden (DE)

(72) Inventors: Christian Wassmer, Hausen (DE); Burkhard Standke, Loerrach (DE); Thomas Schlosser, Inzlingen (DE); Regina Krause, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 14/395,598

(22) PCT Filed: Feb. 25, 2013

(86) PCT No.: PCT/EP2013/053668
§ 371 (c)(1),
(2) Date: Oct. 20, 2014

(87) PCT Pub. No.: WO2013/156187
PCT Pub. Date: Oct. 24, 2013

(65) Prior Publication Data
US 2015/0152247 A1    Jun. 4, 2015

(30) Foreign Application Priority Data

Apr. 20, 2012 (DE) ............... 10 2012 206 508

(51) Int. Cl.
| | |
|---|---|
| C07F 7/04 | (2006.01) |
| C08K 5/5455 | (2006.01) |
| C08G 77/20 | (2006.01) |
| C08G 77/26 | (2006.01) |
| C08G 77/388 | (2006.01) |

(52) U.S. Cl.
CPC ............ *C08K 5/5455* (2013.01); *C08G 77/20* (2013.01); *C08G 77/26* (2013.01); *C08G 77/388* (2013.01)

(58) Field of Classification Search
CPC ................................................. C08K 5/5455
USPC ........................................................ 556/413
See application file for complete search history.

(56) References Cited

U.S. PATENT DOCUMENTS

| | | | |
|---|---|---|---|
| 3,249,461 A | 5/1966 | Te Grotenhuis | |
| 5,885,341 A | 3/1999 | Standke et al. | |
| 6,641,870 B2 | 11/2003 | Bartkowiak et al. | |
| 6,767,982 B2 | 7/2004 | Standke et al. | |
| 7,834,073 B2 | 11/2010 | Standke et al. | |
| 8,039,110 B2 | 10/2011 | Jenkner et al. | |
| 8,101,682 B2 | 1/2012 | Standke | |
| 8,188,266 B2 | 5/2012 | Edelmann et al. | |
| 8,298,679 B2 | 10/2012 | Albert et al. | |
| 8,394,972 B2 | 3/2013 | Wassmer et al. | |
| 8,481,165 B2 | 7/2013 | Edelmann et al. | |
| 8,728,225 B2 | 5/2014 | Standke et al. | |
| 8,747,541 B2 | 6/2014 | Scharfe et al. | |
| 8,864,895 B2 | 10/2014 | Albert et al. | |
| 2008/0004414 A1 | 1/2008 | Schorzman et al. | |
| 2008/0206572 A1 | 8/2008 | Edelmann et al. | |
| 2009/0005518 A1 | 1/2009 | Just et al. | |
| 2009/0007818 A1 | 1/2009 | Militz et al. | |
| 2009/0068587 A1* | 3/2009 | Maeda | C07C 233/27 430/283.1 |
| 2011/0152466 A1 | 6/2011 | Dershem | |
| 2012/0321803 A1 | 12/2012 | Borup et al. | |
| 2013/0167754 A1 | 7/2013 | Wassmer et al. | |

FOREIGN PATENT DOCUMENTS

| | | |
|---|---|---|
| CN | 101798464 A * | 8/2010 |
| WO | WO 2010/019832 A2 | 2/2010 |
| WO | WO 2013/156185 A1 | 10/2013 |
| WO | WO 2013/156188 A1 | 10/2013 |

OTHER PUBLICATIONS

U.S. Appl. No. 14/395,750, filed Oct. 20, 2014, Wassmer, et al.
U.S. Appl. No. 14/395,735, filed Oct. 20, 2014, Wassmer, et al.
International Search Report issued May 16, 2013 in PCT/EP2013/053668.

* cited by examiner

*Primary Examiner* — Porfirio Nazario Gonzalez
*Assistant Examiner* — Kofi Adzamli
(74) *Attorney, Agent, or Firm* — Oblon, McClelland, Maier & Neustadt, L.L.P.

(57) ABSTRACT

The invention relates to a composition and to a process for producing the composition comprising (meth)acrylamido-functional siloxanes, and to the use thereof.

18 Claims, No Drawings

EASILY PREPARABLE, REDUCED-VOC, ENVIRONMENTALLY FRIENDLY (METH)ACRYLAMIDO-FUNCTIONAL SILOXANE SYSTEMS, PROCESS FOR PREPARATION THEREOF AND USE

CROSS REFERENCE TO RELATED APPLICATIONS

The present application is a 35 U.S.C. §371 national stage patent application of International patent application PCT/EP2013/053668, filed on Feb. 25, 2013, published as WO/2013/156187 on Oct. 24, 2013, the text of which is incorporated by reference, and claims the benefit of the filing date of German application no. 10 2012 206 508.3, filed on Apr. 20, 2012, the text of which is also incorporated by reference.

The invention relates to a composition and to a process for producing the composition comprising (meth)acrylamido-functional siloxanes, preferably (meth)acrylamido-functional alkoxysiloxanes, and to the use thereof.

For the use of glass fibres in fibre composite materials, the glass fibre is frequently surface-treated with functionalized silanes. This is commonly accomplished with the aid of aqueous slips in which the organofunctional silane is dissolved. Depending on the chemical function of the silanes, there may be a positive influence on the desired properties, for example fibre thickness or else cuttability (specifically for short fibre reinforcement). In this case, the organofunctional silanes also make a significant contribution to promoting adhesion between the inorganic fibre and the organic resin. Even though application by means of aqueous slips is desirable, the organofunctional silanes are still prepared in organic solvents.

For example, specific methacryloyl-functionalized silanes, for example 3-methacryloyloxypropyltrimethoxysilane, are used in fibre composite materials, examples being thermosets and thermoplastics, in order to increase the performance of the fibre composite material. In other applications too, such as in filler modification, in coatings or in adhesives/sealants, these functionalized silanes are used as adhesion promoter between organic and inorganic matrix.

A further application lies in the modification of specific properties, for example increasing the cuttability of glass fibres. One type of compound used for that purpose is methacrylamidoalkylalkoxysilanes such as $(RO)_xRSiNH(CO)C(CH_3)=CH_2$ or else chromium(III) methacrylate chlorine complexes, for example Volan® from Du Pont (R=C1-C6 alkyl group).

In order to supply the compounds in aqueous slips, they must have good water solubility. The chromium-based methacrylate compounds exhibit good water solubility. However, they have the disadvantage of containing heavy metals. Methacrylamidoalkylalkoxysilane leads, in an aqueous medium, to hydrolysis of the alkoxy groups and to release of the corresponding alcohols methanol (toxic) and ethanol, and hence to the formation of VOCs (volatile organic compounds).

WO 00/75148 A1 (Comparative Example 2 here) describes a synthesis proceeding from aminopropyltriethoxysilane with a methyl methacrylate in the presence of dibutyltin oxide (DBTO). This reaction has a number of disadvantages: firstly, for a substantially complete conversion, a 100% excess of methyl methacrylate is used, which has to be distilled off again. Thus, the space-time yield is poor. In addition, the reaction is conducted at high temperatures of 165-170° C., which results in problems because of the tendency of acrylic acid to polymerize. To avoid polymerization, a stabilizer has to be used. Catalysts used for essentially complete conversion are toxic, environmentally damaging organotin compounds, for example dibutyltin oxide (DBTO). A further disadvantage of this process is the costly and inconvenient rectification of the reaction product at high bottom temperatures and very low absolute pressure. For this purpose, a further gas phase stabilizer has to be used in order to avoid polymerization in the column. A heavy metal-containing residue remains in the bottoms, and has to be disposed of separately. The distillation product, the commercially available product Y-5997 from Momentive $(CH_3O)_x(C_2H_5O)_{3-x}Si(CH_2)_3NH(CO)C(CH_3)=CH_2$, is virtually water-insoluble.

U.S. Pat. No. 3,249,461 describes the synthesis of methacrylamidopropylmethoxysilane by the reaction of methacryloyl chloride in inert anhydrous solvents containing aromatic hydrocarbons with aminopropyltrimethoxysilane. A disadvantage in this process is the release of an equimolar amount of hydrogen chloride, which has to be removed from the process in a costly and inconvenient manner. Moreover, the use of aromatic solvents is undesirable for environmental reasons. In addition, the high solvent content reduces the space-time yield. The use of dinitrobenzene as a stabilizer is also disadvantageous.

The problem addressed by the present invention was that of providing further (meth)acrylamido-functional organosilicon compounds which release a lower level of volatile solvents (VOCs) in use, and the preparation and use thereof. In addition, the (meth)acrylamido-functional organosilicon compounds are to have improved adhesion properties; more particularly, as an addition or additive in adhesives and sealants, they are to improve the adhesive properties thereof. Moreover, a heavy metal-free process was to be developed, which gives good conversions without the use of toxic compounds such as chromium(III) compounds or tin compounds. Equally, the use of stabilizers, as is necessary in the prior art, was to be reduced; more particularly, a process which manages without the use of gas phase stabilizers was to be developed. A further problem was to discover a process which allows preparation in the form of a one-pot reaction. A further problem was to reduce the emission of organic solvents in the course of preparation, to make the preparation more environmentally compatible, and preferably also to reduce VOC release in use as a result of hydrolysis of the alkoxy functions. In addition, the (meth)acrylamido-functional organosilicon compounds are to be storage-stable. Moreover, the fields of use of the (meth)acrylamido-functional organosilicon compounds are to be extended, and new uses are to be discovered.

The problems were solved by a composition according to claims 1 and 16, and by the process according to claim 5, a formulation according to claim 17 and the use according to claim 18, with elucidation of preferred embodiments in the dependent claims and in the description.

The problem was likewise solved by a controlled aqueous conversion of aminosilanes, especially of aminoalkylalkoxysilanes, preferably of di- and/or triaminoalkyl-functional silanes, in the presence of moisture or aqueous media (synonymous with: in the presence of water), more preferably through hydrolysis and preferably condensation of N-(2-aminoethyl)-3-aminopropyltrialkoxysilane or 3-aminopropyltrialkoxysilane to oligomers, referred to hereinafter as siloxanols, and reaction with an acrylic anhydride, especially (meth)acrylic anhydride, in an aqueous medium. The acrylamido-functional siloxanes obtained, more preferably (meth)acrylamidoalkyl-functional alkoxysilanes, are preferably freed of any diluents used or freed of alcohol of hydrolysis formed. In alternative embodiments, the acrylamido-functionalized oligomeric alkoxysiloxanes thus obtained can be at least partly hydrolysed, more preferably fully hydrolysed, and used. Optionally, they can be essentially freed of alcohol (of hydrolysis) after a further hydrolysis and before use.

It is a great advantage of the invention that the acrylamido-functional siloxanes thus obtained can preferably be used in the form of the bottom product without further purification. Thus, it is possible with the process according to the invention and the inventive compositions containing acrylamido-functional siloxanes, especially (meth)acrylamidoalkyl-functional alkoxysiloxanes, to supply particularly economically viable and environmentally compatible products.

The invention provides a composition comprising acrylamido-functional siloxanes derived from a
a) reaction of a component A which is an aminoalkyl-functionalized silicon compound selected from
  (i) an aminoalkyl-functional alkoxysilane or a mixture of aminoalkyl-functional alkoxysilanes, each in the presence of a defined amount of water,
  or
  (ii) a hydrolysis or condensation product of at least one aminoalkyl-functional alkoxysilane
  or
  (iii) a mixture comprising at least one aminoalkyl-functional alkoxysilane and a hydrolysis and/or condensation product of at least one aminoalkyl-functional alkoxysilane,
  with a component B which is an acrylic anhydride, and optionally in the presence of a diluent,
and optionally
b) removal of at least a portion of the diluent and/or alcohol of hydrolysis, and optionally of at least a portion of the water which was used in (i) and optionally in (ii) or (iii); preferably, (ii) and (iii) were also prepared by reaction with a defined amount of water.

It was found that, in the case of direct reaction of aminosilanes with acrylic anhydride, the unwanted transesterification products occur, as shown in Comparative Example 1, since the methacrylic acid released reacts in a transesterification reaction with the alkoxy groups in the aminosilane.

The inventors have surprisingly succeeded in avoiding these unwanted transesterification reactions which occur in a reaction of aminosilanes with (meth)acrylic anhydride. The unwanted transesterification can be avoided when, before the reaction with (meth)acrylic anhydride, the aminosilanes are oligomerized by hydrolysis and optionally condensation to siloxanes, especially aminoalkyl- and alkoxyfunctionalized siloxanes, with surprisingly successful subsequent acrylamide formation between the aminoalkyl-functional silicon compounds and the (meth)acrylic anhydride. It was particularly surprising that no transesterification products, i.e. no alkoxycarboxysilanes nor any alkoxycarboxysiloxanes, were detectable.

Preferably, for hydrolysis of the aminoalkyl-functional silanes, especially of component A according to (i), or for preparation of components A according to (ii) or (iii), a defined amount of water is used, preferably between greater than or equal to 0.1 mol and 4.5 mol of water/mol of silicon atoms (inclusive), especially between 0.1 and 2.0 mol and preferably between greater than or equal to 0.3 mol and 1.5 mol of water/mol of silicon atoms in the aminoalkyl-functional silicon compounds, particular preference being given to an amount of water between greater than or equal to 0.5 and 1.0 mol of water/mol of silicon atoms. The bottom temperature in the course of reaction with (meth)acrylic anhydride can be controlled via the rate of dropwise addition of (meth)acrylic anhydride. By cooling the reaction flask, it is possible to achieve quicker addition of (meth)acrylic acid. The maximum possible bottom temperature depends on the stabilizer system in the reaction mixture and the boiling point of the components used.

The active ingredient content of the inventive compositions is preferably up to 100% by weight, and is therefore free of water and solvent and/or free of diluent. Likewise preferred compositions may have a certain content of siloxanols as active ingredients. Equally preferred compositions may be those which have a small content of diluent of up to 5% by weight, but preference is given to contents of diluent, especially contents of alcohols, between greater than or equal to 0.0001 and 5% by weight, preferably between greater than or equal to 0.0001 and 1.5% by weight, more preferably between greater than or equal to 0.0001 and 1% by weight.

In the later use, the active ingredient content can be adjusted as desired, by adding further additions such as solvents, auxiliaries, etc., or by virtue of the composition being present as an additive in a formulation, for example in a sealant formulation. Therefore, the active ingredient content in use can be regulated as desired, especially between 0.0001 and 99.99% by weight, ideally between 0.01 and 10% by weight, between 10 and 40% by weight, or alternatively between 40 and 99.99% by weight.

Particularly preferred compositions comprise acrylamido-functional siloxanes, preferably acrylamidoalkyl-functional siloxanes, which are present essentially in the form of alkoxysiloxanes, and which are derived from a reaction a) of a component A, an aminoalkyl-functionalized silicon compound selected from (ii) a hydrolysis and/or condensation product of at least one aminoalkyl-functional alkoxysilane or (iii) a mixture comprising at least one aminoalkyl-functional alkoxysilane and a hydrolysis and/or condensation product of at least one aminoalkyl-functional alkoxysilanes b) with a component B which is an acrylic anhydride, especially of the formula IV, preferably in a diluent, more preferably a protic organic diluent, and optionally c) removal of at least a portion of the diluent and/or alcohol of hydrolysis, and optionally at least a portion of the water, where the water may have been used together with component A and/or has formed in the reaction. Preferably, the diluent, alcohol of hydrolysis and/or water are removed essentially completely, and the inventive composition comprising acrylamido-functional siloxanes is obtained.

According to the invention, it is possible in principle to use any aminoalkoxysilanes for preparation of the hydrolysates and condensates and subsequent reaction with (meth)acrylic anhydride. For better solubility, it is also possible to select mixtures of aminosilanes having a primary amino group and aminosilanes having primary and secondary amino groups for preparation of the (meth)acrylamidoalkyl-functional siloxane. For the desired distinctly improved solubility, preference is given to selecting aminosilanes having one primary and at least one secondary amino group; these at least diamino-functional silanes lead to improved solubility of the corresponding (meth)acrylamidoalkyl-functional siloxane. It is a further advantage of the additional secondary amino group that it neutralizes the (meth)acrylic acid released in the reaction to form a corresponding salt (aminohydromethacrylate).

Preferred aminoalkyl-functional alkoxysilanes correspond to the formula I

where the group B in formula I independently corresponds to a group of the formula II

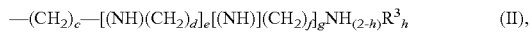

in formula I with $R^1$ independently a linear, branched or cyclic alkyl group having 1 to 8 carbon atoms, especially having 1, 2, 3 or 4 carbon atoms, preferably methyl, ethyl or propyl, and $R^2$ independently a linear, branched or cyclic alkyl group having 1 to 8 carbon atoms, especially methyl, ethyl, propyl, n-butyl, isobutyl, tert-butyl, pentyl, hexyl, heptyl or octyl, and in formula II with $R^3$ independently a linear, branched or cyclic alkyl, aryl or alkylaryl group having 1 to 8 carbon atoms in formula II, especially methyl, ethyl, butyl or benzyl, where h=0 is particularly preferred; and in formula I a is independently 0 or 1, b is independently 0, 1 or 2, b preferably being 0, and in formula II c is independently selected from 1, 2, 3, 4, 5 and 6, d is independently selected from 1, 2, 3, 4, 5 and 6, e is independently selected from 0, 1, 2, 3, 4, 5 and 6, f is independently selected from 1, 2, 3, 4, 5 and 6, g is independently selected from 0, 1, 2, 3, 4, 5 and 6, and h is independently 0 or 1; alternatively preferably e=g=0 or 1, and d=f=2 or 3 and h=0 with c=3 and b=0 and a=0; particularly preferred combinations are with $R^1$ being methyl or ethyl, a=0 and b=0 with c=3 and g, e and h each=0; alternatively likewise preferably, a=0, b=0, c=3, e=1, d=1, 2 or 3, preferably d=2, and g=0, h=0, for diamino-functional silanes, or the B group corresponds to the formula III

with j=1, 2 or 3 and p=0, 1 or 2, p preferably being selected from 1 and 2; if appropriate, p may also be 0.

It is generally preferable when the aminoalkyl-functional alkoxysilane corresponds to a diaminoalkyl-functional or a triaminoalkyl-functional alkoxysilane, especially of the formula I. Likewise particularly preferred are mixtures of the aforementioned silanes, such as aminosilane with diaminosilane or else aminosilane with triaminosilane or diaminosilane with triaminosilane, or else mixtures comprising three or more different aminosilanes of the formula I.

The acrylic anhydrides used are preferably (meth)acrylic acid or (unsubstituted) acrylic anhydride, more preferably of the formula IV

where $R^4$ is independently a hydrogen atom or a methyl group and $R^5$ is independently a hydrogen atom or a methyl group, $R^5$ preferably being a hydrogen atom, Preference is given to $(CH_2=C(CH_3)CO)_2O$ and $(CH_2=CHCO)_2O$.

The inventive composition, which can be obtained from the reaction of (i), (ii) and/or (iii) with component B, can be represented in idealized form by the general idealized formula V below for at least one acrylamido-functional siloxane, where the acrylamido-functional siloxanes may preferably have linear, cyclic and crosslinked structures,

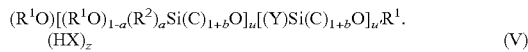

where, in the general formula V,
C corresponds to an acrylamido group and

Y corresponds to $OR^1$ or, in crosslinked and/or three-dimensionally crosslinked structures, independently to $OR^1$ or $O_{1/2}$,
where $R^1$ independently corresponds to a linear, branched or cyclic alkyl group having 1 to 8 carbon atoms, especially having 1, 2, 3 or 4 carbon atoms, or optionally at least partly corresponds to hydrogen, $R^1$ preferably being an alkyl group to an extent of greater than or equal to 10 mol %, preferably an alkyl group to an extent of greater than or equal to 50 mol %, more preferably to an extent of greater than or equal to 90 mol %, preferably greater than or equal to 95 mol % or 98 mol % and more preferably greater than or equal to 99 mol %, and hydrogen up to 100 mol %, and $R^2$ corresponds to a linear, branched or cyclic alkyl group having 1 to 8 carbon atoms, especially as per the definition of formula (I),
HX is an acid, where X is an inorganic or organic acid radical,
with each a independently 0 or 1, each b independently 0, 1 or independently additionally optionally 2, b preferably being 0, with each u independently an integer greater than or equal to 2, u' greater than or equal to 0 and z greater than or equal to 0, z especially being 0 or greater than or equal to 1, where z may preferably be less than to equal to the number of secondary nitrogen atoms in the aminosilane used, and z may likewise preferably be greater than the number of secondary nitrogen atoms, and (u+u')≥2,
where the composition is essentially free of diluent, especially organic solvents, more preferably of protic organic solvents.

Preferably, u on average is selected from an integer from 2 to 500, especially from 2 to 150, preferably from 2 to 80, including all numerical integer values in between, such as 2, 3, 4, 5, 6, 7, 8, 9, 10, 15, 20, 25, 30, 35, 40, 45, 50, 55, 60, 65, 70, 75 and 80, and in each case with a range of variation of up to plus/minus 5, u preferably being between greater than or equal to 20 and 80, more preferably between 20 and 60, preferably between greater than or equal to 20 and 40. In this context, independently of this, u' on average may be selected from an integer between 0 and 200 inclusive, especially between 0 and 100, preferably from 0, 1, 2, 3, 4, 5, 6, 7, 8, 9, 10, 15, 20, 30, 35, 40, 45, 50, 55, 60, 65, 70, 75, 80 and 85, and in each case with a range of variation of up to plus/minus 5, u' preferably being between greater than or equal to 5 and 35, u' preferably being 5 to 30. Preferably, the sum of (u+u') together on average is between greater than or equal to 5 and 100, especially between greater than or equal to 20 and 75, such as around 25 to 60.

A useful HX is acrylic acid or else any other organic or inorganic acid suitable for the later use. It is generally possible to remove the acrylic acid present in the composition if required. It can preferably remain in the composition, bound via hydrogen bonds or as a salt, and contribute to crosslinking of the product as a comonomer in a later use.

Illustrative acrylamido groups (group C) on the silicon atoms of the siloxanes, especially of the alkoxy-functional siloxanes, are described hereinafter, each on a silicon atom:

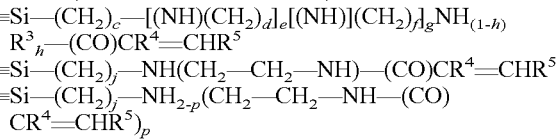

In principle, an acrylamido group (group C), especially an acrylamido group of the siloxanes, is understood to mean all conceivable conversions of the aminoalkyl-functional groups mentioned with (meth)acrylic anhydride or $CHR^5=CR^4(CO)$—, but especially those formed from a reaction of an amino-functional group B according to the preferred formulae II and/or III with an acrylic anhydride of the formula IV. Thus, a C group may be selected from
—$(CH_2)_c$—[(NH)$(CH_2)_d]_e$[(NH)]$(CH_2)_g$NH$_{(1-h)}$R$^3{}_h$—(CO)CR$^4$=CHR$^5$,
—$(CH_2)_j$—NH(CH$_2$—CH$_2$—NH)—(CO)CR$^4$=CHR$^5$ and
—$(CH_2)_j$—NH$_{2-p}$(CH$_2$—CH$_2$—NH—(CO)CR$^4$=CHR$^5$)$_p$.

The invention likewise provides a process for preparing a composition comprising acrylamido-functional siloxanes and/or acrylamido-functional silanes, especially acrylamidoalkoxy-functional siloxanes, and compositions obtainable by this process, by
    conducting the process in at least one step in the presence of water, preferably of a defined amount of water, and reacting a component A, an aminoalkyl-functional silicon compound selected from:
        (i) at least one aminoalkyl-functional alkoxysilane or a mixture of aminoalkyl-functional alkoxysilanes of the formula I, defined as above,
        or
        (ii) a hydrolysis or condensation product of at least one aminoalkyl-functional alkoxysilane of the formula I
        or
        (iii) a mixture comprising at least one aminoalkyl-functional alkoxysilane of the formula I and a hydrolysis and/or condensation product of at least one aminoalkyl-functional alkoxysilane of the formula I,
    with a component B, an acrylic anhydride of the formula IV, defined as above, especially (meth)acrylic anhydride or (unsubstituted) acrylic anhydride, preferably in a diluent, more preferably in a protic organic diluent, such as an alcohol, and optionally
    at least partly removing the diluent and the alcohol of hydrolysis formed in the reaction.

In the process according to the invention, compositions comprising essentially acrylamido-functional siloxanes or compositions of the acrylamido-functional siloxanes in a mixture with acrylamido-functional silanes are preferably obtained.

In one embodiment of the invention, the reaction is conducted in the presence of a diluent, preference being given to an organic protic diluent such as alcohol.

It is preferable in this case when the defined amount of water is established in a process step prior to the step of reaction with component B, especially for preparation of components A (ii) or (iii) from (i).

According to the invention, it is unnecessary to further purify the compositions obtained; more particularly, a complex distillative workup of the acrylamido-functional siloxanes is unnecessary, since the bottom products can preferably be used directly. The inventive bottom products do not require any further purification because no disruptive catalysts or disruptive stabilizers are present in the bottom products. The stabilizers used in the process do not disrupt further use.

It is a particular advantage of the process according to the invention that there is no need to use any gas phase stabilizers, as necessary in the prior art, because the inventive process regime allows direct use of the bottom products as a composition. A complex rectification of the products as in the prior art can be dispensed with. Consequently, the inventive compositions can be prepared in a much more economically viable manner and with more environmentally compatible starting substances than described in the prior art.

In addition, the inventive compositions, in the course of hydrolysis thereof, release a much lower level of volatile solvents (VOCs), such as alcohol of hydrolysis, than known silanes from the prior art. Preferably, a hydrolysis of the inventive compositions forms between greater than or equal to 20 and 80 mol %, especially 20 and 60 mol %, less alcohol of hydrolysis on average per mole of silicon atoms than in the case of the prior art acrylamido-functional monomeric silanes, especially between greater than or equal to 28 and 50 mol % on average per mole of silicon atoms, more preferably between greater than or equal to 50 and 80 mol %. In per cent by weight, up to 20 to 80% by weight, preferably 30 to 80% by weight (inclusive), in relation to the overall composition, more preferably up to 60% by weight and preferably generally above 40% by weight, more preferably above 50% by weight, less alcohol of hydrolysis is released by the (meth)acrylamidosiloxanes compared to the conventional (meth)acrylamidotriethoxysilane.

In preferred embodiments, the process is preferably conducted with an aminoalkyl-functional silicon compound selected from an aminoalkyl-functional alkoxysilane of the formula I, or a hydrolysis or condensation product of at least one aminoalkyl-functional alkoxysilane of the formula I, or a mixture comprising at least one aminoalkyl-functional alkoxysilane of the formula I and a hydrolysis and/or condensation product of at least one aminoalkyl-functional alkoxysilane of the formula I, the hydrolysis and/or condensation of the aminoalkyl-functional alkoxysilane of the formula I being effected in the presence of a defined amount of water, the defined amount of water preferably corresponding especially to 0.1 to 4.5 mol per mole of silicon atoms, especially in the silanes of the formula I, preferably 0.5 to 2.5 mol or alternatively 0.1 to 2.0 mol of water per mole of silicon atoms in the aminoalkyl-functional silicon compound used in the process, preferably 0.3 to 1.5 mol of water per mole of silicon atoms in the aforementioned silicon compound, more preferably 0.5 to 1.0 mol of water per mole of silicon atoms in the silicon compound; preferably, the defined amount of water is established in a process step prior to the step of the reaction with the component B and is preferably at least partly consumed by the hydrolysis.

In preferred embodiments, the process is preferably conducted with an aminoalkyl-functional alkoxysilane of the formula I, or a hydrolysis or condensation product of at least one aminoalkyl-functional alkoxysilane of the formula I or a mixture comprising at least one aminoalkyl-functional alkoxysilane of the formula I and a hydrolysis and/or condensation product of at least one aminoalkyl-functional alkoxysilane of the formula I
    a) with R$^1$ independently methyl or ethyl and with a=0 and b=0 with c=1, 2 or 3 and with the group B of the formula II with g=0 and e=1 and h=0, d=1, 2, 3, preferably d=2, or
    b) with R$^1$ independently methyl or ethyl and with a=0 and b=0 with c=3 and with the group B of the formula II with g, e and h each 0 or, in an alternative, with a=0, b=0, c=3, and with the group B of the formula II with e=1, d=1, 2, 3, preferably d=2 and with g=0, h=0 or with the group B of the formula II with e=g=0 or 1, and d=f=2 or 3 and h=0 with c=3 or with the group B of the formula III with j=3 and p=1 or 2, or
    c) with R$^1$ independently methyl or ethyl and with a=0 and b=0 with c=2 and with the group B of the formula II with g, e and h each 0 or, in an alternative, with a=0, b=0, c=3, and with the group B of the formula II with e=1, d=1, 2, 3, preferably d=2 and with g=0, h=0 or with the group B of the formula II with e=g=0 or 1, and d=f=2 or 3 and h=0 with c=2 or with the group B of the formula III with j=3 and p=1 or 2, or d) with $R^1$ independently methyl or ethyl and with a=0 and b=0 with c=1 and with the group B of the formula II with g, e and h each 0 or, in an alternative, with a=0, b=0, c=3, and with the group B of the formula II with e=1, d=1, 2, 3, preferably d=2 and with g=0, h=0 or with the group B of the formula II with e=g=0 or 1, and d=f=2 or 3 and h=0 with c=1 or with the group B of the formula III with j=3 and p=1 or 2.

It is likewise preferable when the process is preferably conducted with an aminoalkyl-functional alkoxysilane, or a hydrolysis or condensation product of at least one aminoalkyl-functional alkoxysilane or a mixture comprising at least one aminoalkyl-functional alkoxysilane and a hydrolysis and/or condensation product of at least one aminoalkyl-functional alkoxysilane selected from the following aminoalkyl-functional alkoxysilanes, especially of the general formula I:

3-aminopropyltrimethoxysilane, 3-aminopropyltriethoxysilane, 3-aminopropylmethyldimethoxysilane, 3-aminopropylmethyldiethoxysilane, 1-aminomethyltrimethoxysilane, 1-aminomethyltriethoxysilane, 2-aminoethyltrimethoxysilane, 2-aminoethyltriethoxysilane, 3-aminoisobutyltrimethoxysilane, 3-aminoisobutyltriethoxysilane, N-n-butyl-3-aminopropyltriethoxysilane, N-n-butyl-3-aminopropylmethyldiethoxysilane, N-n-butyl-3-aminopropyltrimethoxysilane, N-n-butyl-3-aminopropylmethyldimethoxysilane, N-n-butyl-1-aminomethyltriethoxysilane, N-n-butyl-1-aminomethylmethyldimethoxysilane, N-n-butyl-1-aminomethyltrimethoxysilane, N-n-butyl-1-aminomethylmethyltriethoxysilane, benzyl-3-aminopropyltrimethoxysilane, benzyl-3-aminopropyltriethoxysilane, benzyl-2-aminoethyl-3-aminopropyltrimethoxysilane, benzyl-2-aminoethyl-3-aminopropyltriethoxysilane, diaminoethylene-3-propyltrimethoxysilane, diaminoethylene-3-propyltriethoxysilane, triaminodiethylene-3-propyltrimethoxysilane, triaminodiethylene-3-propyltriethoxysilane, (2-aminoethylamino)ethyltrimethoxysilane, (2-aminoethylamino)ethyltriethoxysilane, (1-aminoethylamino)methyltrimethoxysilane and (1-aminoethylamino)methyltriethoxysilane, preference being given especially to di- and/or triaminoalkoxysilanes. Particular preference is given to diaminoethylene-3-propyltrimethoxysilane, diaminoethylene-3-propyltriethoxysilane, triaminodiethylene-3-propyltrimethoxysilane, triaminodiethylene-3-propyltriethoxysilane.

It is additionally particularly preferable when the process is conducted in at least one step in the presence of a defined amount of water; more particularly, as follows, component A, an aminoalkyl-functional silicon compound selected from:

(i) at least one aminoalkyl-functional alkoxysilane or a mixture of aminoalkyl-functional alkoxysilanes of the formula I, defined as above, with a defined amount of water, or (ii) a hydrolysis or condensation product of at least one aminoalkyl-functional alkoxysilane of the formula I, which are prepared from the aminoalkyl-functional alkoxysilane in the presence of a defined amount of water, or (iii) a mixture comprising at least one aminoalkyl-functional alkoxysilane of the formula I and a hydrolysis and/or condensation product of at least one aminoalkyl-functional alkoxysilane of the formula I, which are prepared from the aminoalkyl-functional alkoxysilane in the presence of a defined amount of water, is subsequently reacted with a component B, an acrylic anhydride of the formula IV, defined as above, especially methacrylic anhydride or (unsubstituted) acrylic anhydride, the reaction preferably being effected in a diluent, preferably in an organic protic diluent, and the diluent and/or the alcohol of hydrolysis formed in the reaction is optionally at least partly removed.

In further preferred process variants, preference is given to processes comprising in a step (Ia) comprising the component steps which follow, admixing component A, an aminoalkyl-functional silicon compound, according to (i) the at least one aminoalkyl-functional alkoxysilane of the formula I as defined above, optionally in a mixture with a diluent, especially organic protic diluents, preferably an alcohol, more preferably methanol, ethanol or propanol, with a defined amount of water, preference being given to continuous or discontinuous metered addition of water; for example, 0.5 to 4.5 mol of water per mole of silicon atoms, especially 0.5 to 2.5 mol, preferably 0.5 to 1.5 mol and more preferably 0.5 to 1.0 mol of water per mole of silicon atoms in the silicon compound are metered in; preferably within a defined period, and preferably with stirring, preferably within the temperature range of 0 to 75° C., especially 30 to 75° C., preferably between 40 and 65° C., more preferably between 50 and 65° C., for between 10 minutes and 10 hours, preferably between 10 minutes and 5 hours, more preferably between 10 minutes and 2.5 hours, and optionally at least partly removing the alcohol of hydrolysis and/or the added diluent, preferably the alcohol added, and adding the acrylic anhydride of the formula IV to the resulting mixture, especially at a temperature of the mixture between 0 and 30° C., preferably metering in the acrylic anhydride of the formula IV such that the temperature of the mixture does not rise above 75° C., and optionally adding a stabilizer to the mixture, and in a step (II), optionally at least partly removing the added diluent and/or alcohol of hydrolysis formed and/or optionally the water formed in the reaction under ambient or reduced pressure and elevated temperature.

In an alternative, in a step (Ib) comprising the component steps which follow, component A, an aminoalkyl-functional silicon compound, according to (ii) or (iii), optionally in a mixture with a diluent, preferably alcohol, more preferably methanol, ethanol or propanol, is reacted with acrylic anhydride of the formula IV, preferably metering in the acrylic anhydride of the formula IV such that the temperature of the mixture does not rise above 75° C., a stabilizer is optionally added to the mixture, and in a step (IIa), in an alternative, the added diluent and any alcohol of hydrolysis formed and/or optionally the water formed in the reaction is optionally at least partly removed under ambient or reduced pressure and elevated temperature, or in a step (IIb), in a further alternative, after step (I), a base is added to the mixture, especially when the acrylic anhydride is present in a molar excess relative to the primary amino groups of the aminoalkyl-functional silane, said base preferably being added in an alcoholic and/or aqueous phase, preferred bases comprising alkali metal/alkaline earth metal hydroxide, alkali metal/alkaline earth metal alkoxide or carbonates of alkali metals/alkaline earth metals, with optional
removal of the precipitate, especially of the alkali metal acrylates, with optional
addition of an organic acid and at least partial removal of the alcohol of hydrolysis and/or of the diluent and optional removal of at least a portion of the water, with optional addition of further water for removal of the alcohol of hydrolysis in this step. Preferably, only the alcohol of hydrolysis is removed. Preferred alkali metal or alkaline earth metal hydroxides or oxides are calcium hydroxide, calcium oxide, but it is also possible to use sodium hydroxide/oxide.

The aminohydro(meth)acrylate can be cleaved under basic conditions. Suitable bases are preferably basic alkali metal salts such as NaOH or KOH, preferably alkali metal alkoxides such as NaOR or KOR, preferably where R=alkyl-, preferably methyl-, and particular preference being given to potassium methoxide. When potassium methoxide is used, the methacrylic acid is precipitated as potassium methacrylate and can be removed easily by filtration.

The composition thus obtained can be used directly, and preferably has an active ingredient content of acrylamido-functional siloxane of greater than 90% by weight in relation to the overall composition, more preferably an active ingredient content of 95 up to 100% by weight, especially of 98 to 100% by weight.

Useful diluents generally include all suitable diluents, such as organic aprotic or protic diluents and mixtures of these, examples being alcohols, ethers or ketones, ethyl acetate, methylene chloride, preference being given to organic protic diluents or water for dilution of the composition prepared. The alcohol (of hydrolysis) already present as a diluent and/or formed in the reaction is removed substantially, preferably completely, in all process variants according to the invention. The distillative removal of the alcohol is carried out preferably under reduced pressure. Alternatively, until an alcohol content of less than 20% by weight to 0.0001% by weight, preferably less than or equal to 12% by weight, more preferably less than or equal to 5% by weight, especially preferably less than or equal to 3.0% by weight, even more preferably less than or equal to 1.0% by weight, especially less than or equal to 0.5% by weight is detected, or down to the current analytical detection limit. Generally speaking, the resulting composition of the invention is then substantially solvent-free, more particularly alcohol-free. The composition obtained accordingly preferably corresponds directly to the composition of the invention, and preferably need not itself be further purified.

It is particularly preferable when the volatile diluent and the alcohol of hydrolysis are removed down to a content in the overall composition of less than or equal to 12% by weight to 0% by weight, preferably to less than or equal to 10% by weight, more preferably less than or equal to 5% by weight, even more preferably less than or equal to 2% by weight to 0.0001% by weight, especially less than or equal to 1 to 0.0001% by weight, the removal preferably being effected by distillation, especially under reduced pressure in the range from 1 to 1000 mbar, preferably from 0.001 to 350 mbar, more preferably between 0.001 and 250 mbar, at a mild temperature of bottom temperature less than 60° C., especially less than 55° C.

Preferably, in the process, the molar ratio of the nitrogen atoms in the aminoalkyl-functional silicon compound, especially in the aminoalkyl-functional silanes, to the molar ratio of the $CHR^5=CR^4(CO)-$ acryloylcarbonyl function released from the acrylic anhydride of the formula IV is in the range from 1:5 to 5:1, especially 1:2 to 2:1, preferably 1:1.5 to 1.5:1, more preferably 1:1 with a range of variation of plus/minus 0.5, preferably plus/minus 0.2.

Alternatively, it may be particularly preferable to use a diaminoalkyl-functional silane in an equimolar amount with acrylic anhydride of the formula I. The function of the secondary amine function here is to neutralize the free acrylic acid, and can react to give an aminohydromethacrylate, which is subsequently cleaved under basic conditions.

The invention also provides a process for preparing acrylamido-functional silanes, which can be removed by means of distillation in a simple manner from the inventive composition, which is prepared by the process elucidated above. Preferably, the acrylamido-functional silanes are distilled off under reduced pressure, preferably between 0.001 and 800 mbar and at elevated temperature. A particularly gentle distillation can be effected with a thin-film evaporator. Generally, standard distillation columns or rectification columns are likewise suitable. The monomer content in the composition can be controlled by addition of a defined amount of water. In this way, it is possible to establish a maximum silane content, preferably without transesterification products and preferably with a simultaneously low content of siloxanes. In order to prepare a composition having relatively high acrylamido-functional alkoxysilane contents, preferably 0.2 to 1.5 mol of water per mole of aminoalkyl-functional alkoxysilane are used, more preferably 0.2 to 0.8 or else 0.4 to 0.8 mol of water per mole of aminoalkyl-functional alkoxysilane.

The invention also provides a formulation comprising a composition or a process product and at least one further formulation constituent selected from auxiliary, polymer, water, diluent, additive, pigment, filler, acid, base and buffer. Polymers used in the formulation may preferably be silane-terminated polyurethanes. Further formulation constituents may be plasticizers, catalysts, crosslinkers and/or water scavengers.

Preference is further given to a process wherein the active ingredient content of acrylamido-functional siloxanes is adjusted to 0.0001 to 100% by weight, or 0.0001 to 99.99% by weight in the overall composition, especially to 10 to 80% by weight, preferably to 20 to 60% by weight, more preferably to 35 to 60% by weight, where the active ingredient content can be adjusted to any value between 99.99% by weight and 0.00001% by weight by dilution with a diluent, preferably with water or optionally with aqueous alcohols or any other suitable diluent. The diluents used may also be suitable organic solvents such as ketones, aldehydes, aromatic solvents, or else monomers, prepolymers and polymers.

It is likewise possible to add customary acids, bases, additives, auxiliaries, fillers, stabilizers, pigments, to adjust the product properties or the colour, or to increase storage stability.

For solubilization in aqueous systems, it is possible to add typical acids for regulation of pH to the composition, for example mineral acid such as HCl, sulphuric acid or else organic acids, preference being given to organic acids such as acetic acid, lactic acid or formic acid. The pH of these aqueous systems can be set between 3 and 11, preference being given to pH values between 6 and 8.

The preparation process likewise has an advantageous effect on the viscosity of the compositions. Thus, the compositions prepared in accordance with the invention are high-mobility liquids of a viscosity which allows easy processing, simple transfer and measurement. The viscosity of the compositions—prepared as the bottom product—is between 1 mPas and 3000 mPas, preferably between 500 and 1500 mPas, further preferably between 1000 and 2000 mPas.

The invention likewise provides compositions obtainable by an aforementioned process and comprising acrylamidofunctional siloxanes, preferably essentially acrylamidoalkyl-functional siloxanes and optionally acrylamidoalkyl-functional silanes, preferably water-soluble acrylamidoalkyl- and alkoxy-functional siloxanes. In this context, the acrylamidoalkyl- and alkoxy-functional siloxanes essentially do not have any hydroxyl groups and/or any carboxysilanes, and are preferably present essentially in the form of at least acrylamidoalkyl- and alkoxy-functional siloxanes. In an alternative embodiment of the invention, the acrylamidoalkyl- and alkoxy-functional siloxanes may be at least partly or fully hydrolysed. Preferably, the composition comprises acrylamidoalkyl-aminoalkyl-functional siloxanes; more preferably, the composition comprises acrylamidoalkyl-aminoalkylalkoxy-functional siloxanes.

The invention further provides for the use of a composition and of the process products as an adhesion promoter, for functionalization of glass, especially for functionalization of glass fibres, for modification of fillers, pigments, organic surfaces and/or inorganic surfaces, especially as a filler coating, where the fillers may be inorganic or organic fillers, coating of pigments, coating of organic or inorganic surfaces, in dental impression compounds, in dental polymer compounds, as an additive in polymers, in adhesives, in sealants, in fibre composite materials, together with monomers or polymers, especially thermoplastics, thermosets, elastomers, for functionalization of polymers, for adjusting the profile of properties of polymers, for production of masterbatches, as an additive in resin systems, especially in unsaturated organic resin systems, such as alkyd resins. Particular preference is given to use for attachment/binding of inorganic materials to organic materials, especially unsaturated organic materials. It is likewise possible to use the inventive acrylamidoalkyl-functional siloxanes in and/or together with unsaturated polyesters. It is likewise possible to use the inventive compositions for production of masterbatches. In this context, each of the aforementioned uses is claimed for the acrylamidoalkyl-functional alkoxysiloxanes and acrylamidoalkyl-functional alkoxysilanes, and for the mixtures of these.

The following examples illustrate the process according to the invention in more detail without limiting the invention to these examples.

Determination Methods:

The alcohol content after hydrolysis is determined by gas chromatography (% by weight). $SiO_2$ content of organic silicon compounds: determined by processes known to those skilled in the art, for example oxidation of the organic constituents, followed by calcination, hydrofluoric acid fuming and determination of the weight difference (%=% by weight). Determination of nitrogen: By a method known to those skilled in the art, for example according to Kjeldahl. Shear rates with tensile testing machine after full curing under standard climatic conditions: 23° C., 50% rel. humidity for 14 days (DIN EN ISO 527).

Compounds Used:

"TEMPO (2,2,6,6-tetramethylpiperidinyloxy free radical) and 4-hydroxyTEMPO" "SANTONOX (Flexsys America, Akron, Ohio) antioxidant 4,4'-thiobis(6-t-butyl-m-cresol)"

EXAMPLE 1

A 1 l stirred apparatus with distillation system was initially charged with 222.24 g of N-(3-(trimethoxysilyl)propyl)ethylenediamine (1.0 mol), and 200.92 g of methanol were stirred in. Subsequently, 26.98 g of demineralized water were added while stirring within 2 minutes. After 0.5 hour, the methacrylic anhydride was added dropwise while cooling at a bottom temperature of 13.8 to 21.9° C. within 1.8 hours. Subsequently, the methacrylic acid was precipitated by adding 0.95 mol of 32% methanolic potassium methoxide solution and filtered off by means of a laboratory pressure filter. The filter residue was washed with a total of 226.13 g of n-hexane. 100.05 g of 1.0% acetic acid and 2.11 g of glacial acetic acid were added to the filtrate in the apparatus while stirring. The alcohol of hydrolysis was distilled off at a bottom temperature of 32° C. to 49.8° C. 152.6 g of yellowish low-viscosity product were obtained.

TABLE 1

Analysis results from Example 1

| Determination | Method | Result |
|---|---|---|
| Total N [%] | see above | 4.6 |
| $SiO_2$ content [%] | see above | 11.2 |
| Free methanol [%] | see above | 2.4 |
| pH | DIN ISO 4925 | 9.5 |
| Viscosity [mPa · s] | DIN 53015 | 82.3 |
| 1H and 13C NMR | Oligomerized methacrylamidosilane was found. | |

EXAMPLE 2

A 500 ml stirred apparatus with distillation system was initially charged with 155.09 g of aminopropyltriethoxysilane (0.70 mol) and 40.14 g of ethanol. Subsequently, 10.12 g of demineralized water (0.52 mol) were added dropwise within one minute. In the course of this, the bottom temperature rose from 27.9° C. to 29.0° C. At a bottom temperature of 40.1° C. to 60.8° C., free ethanol was distilled off at an absolute pressure of 226 mbar to <1 mbar. The amount of distillate was 76.3 g. Subsequently, the addition of methacrylic anhydride was commenced at a bottom temperature of 20.5° C. During the addition of 108.02 g of methacrylic anhydride (0.70 mol), an additional 51.6 g of ethanol were metered in, in the course of which the bottom temperature rose to max. 72.3° C. The addition was effected within 1.85 hours. Subsequently, free ethanol was distilled off at an absolute pressure of 159 mbar to <1 mbar and a bottom temperature of 48.0° C. to 57.8° C. The amount of distillate was 62.2 g. 0.02 g of 4-hydroxy-tempo was stirred into the bottoms for stabilization. 197.7 g of clear, pale yellowish liquid were obtained as the bottom product. Table 2 lists the associated analysis results.

TABLE 2

Analysis results from Example 2

| Determination | Method | Result |
|---|---|---|
| Total N [%] | see above | 4.6 |
| $SiO_2$ content [%] | see above | 20.3 |
| Free ethanol [%] | see above | 1.0 |
| pH | DIN ISO 4925 | 5.2 |
| Viscosity [mPa · s] | DIN 53015 | 1352 |

TABLE 2-continued

Analysis results from Example 2

| Determination | Method | Result |
|---|---|---|
| 1H and 13C NMR | Oligomerized methacrylamidosiloxane was found with a small content of methacrylamidosilane and free methacrylic acid. | |

COMPARATIVE EXAMPLE 1

A 500 ml stirred apparatus with distillation system was initially charged with 88.81 g of aminopropyltriethoxysilane (0.401 mol) and 34.80 g of aminopropyltrimethoxysilane (AMMO) (0.194 mol). 92.61 g of methacrylic anhydride (0.6 mol) were added dropwise while cooling by means of an ice bath within 1 hour. In the course of this, the bottom temperature rose to max. 32.0° C. Subsequently, some of the free methacrylic acid was distilled off at an absolute pressure of 6 mbar up to a bottom temperature of 115° C. 175.8 g of pale yellowish bottom product were obtained. Table 3 lists the associated analysis results.

TABLE 3

Analysis results for the bottom product from Comparative Example 1

| Determination | Method | Result |
|---|---|---|
| Total N [%] | see above | 4.4 |
| SiO2 content [%] | see above | 19.4 |
| pH | DIN ISO 4925 | 5.5 |
| Viscosity [mPa · s] | DIN 53015 | 447 |
| 1H and 13C NMR | Quantitative evaluation shows: 43 mol % of methacrylamidopropylmethoxydiethoxysilane 57 mol % of methacrylamidopropyldialkoxycarboxysilane* *carboxy = methacrylic ester | |

COMPARATIVE EXAMPLE 2

Comparative Example for WO 00/75148 A1

A 1 l stirred apparatus with distillation system was initially charged with 398.07 g of aminopropyltriethoxysilane (1.8 mol), and 1.99 g of dibutyltin oxide, 0.037 g of ionol and 0.18 g of 4,4'-thiobis(6-tert-butyl-m-cresol) were stirred in. Subsequently, within 2 hours, a mixture of 360.35 g of methyl methacrylate (3.60 mol) and 5.41 g of dipropylamine was metered in at a bottom temperature of 152.8° C. to 165.5° C. After a reaction time of 0.3 hour, at a top temperature of 76.5° C. to 80.4° C., a mixture of methanol, ethanol, methyl methacrylate and ethyl methacrylate was removed. After a distillation time of 2.5 hours, at an absolute pressure of 316 mbar to <1 mbar and a bottom temperature up to 157.2° C., residual amounts of low boilers were removed from the bottom product. A total of 287.8 g of distillate was removed. 461.35 g of pale yellowish and low-viscosity liquid were obtained as the bottom product. In accordance with the disclosure of WO 00/75148 A1, the crude methacrylic product is distilled under high vacuum. For the purposes of determining the solubility, it was sufficient in the present case to use the crude product that still contains dibutyltin oxide. For later use, a rectification disclosed by WO 00/75148 A1 would be necessary.

TABLE 4

Analysis results from Comparative Example 2

| Determination | Method | Result |
|---|---|---|
| Total N [%] | see above | 5.0 |
| SiO2 content [%] | see above | 22.0 |
| Free methanol [%] | see above | 0.1 |
| pH | DIN ISO 4925 | 9.7 |
| Viscosity [mPa · s] | DIN 53015 | 50.1 |

Determination of VOC Release:

Methacrylamidopropylsiloxane (from Example 2) compared to Y-5997 (methacrylamidopropylmethoxyethoxysilane). The maximum amount of VOC releasable is 57.8% lower in the case of methacrylamidopropylsiloxane compared to Y-5997; see Table 5.

TABLE 5

VOC contents

| Determination | Method | Unit | Methacrylamido-propylsiloxane from Example 2 | Y-5997 |
|---|---|---|---|---|
| Methanol after hydrolysis | see above | w/w %* | <1 | 34 |
| Ethanol after hydrolysis | see above | w/w % | 19 | 11 |
| VOC | Sum total of methanol/ethanol after hydrolysis | w/w % | 19 | 45 |

*w = "weight"

Performance Testing in Unsaturated Polyester Resins:

In the artificial stone industry, unsaturated polyester resins are manufactured, for example, with silicon-containing natural stone (quartz sand/quartz flour) to give corresponding stone slabs. In the testing described hereinafter, the influence of the methacrylamido-functional siloxanes as an additive in the UPE resin on the strength of the synthetic stone products is tested in the laboratory.

Laboratory method: 1000.0 g of quartz sand (particle size distribution: 0.1-0.6 mm) were initially charged. A mixture of 95.5 g of UPE resin (Palatal P4-01), 1.8 g of hardener (TPBP-HA-M1), 2.5 g of methacrylamido-functional siloxane, 1.8 g of accelerator (Octa-Soligen Cobalt6) was added to the quartz sand. After stirring for 5 minutes, the homogeneous blend was used to produce six test specimens (dimensions 22×22×170 mm) by means of a metal mould and rams. These were stored at 23° C. and 50% relative humidity overnight. Subsequently, by means of three-point flexural testing (Zwick instrument), the maximum force to break the test specimens was measured.

As apparent in Table 6, the flexural strength increased as a result of addition of 0.22% methacrylamido-functional siloxane (from Example No. 2) to the UPE resin by 44.7% compared to the unmodified UPE resin.

TABLE 6

| Additive in the UPE resin | Amount of additive [w/w %] | Average max. force [N] | Relative increase in breaking force [%] |
|---|---|---|---|
| No additive | 0 | 772 | 0 |
| Methacrylamidopropylsiloxane | 0.22 | 1117 | 44.7 |

It is shown very clearly that very good results for flexural strengths in natural rock slabs combined with low VOC nuisance are achieved with the methacrylamido-functional siloxanes.

Performance Testing in Sealant Formulations:

There follows a description of the performance testing of inventive compositions comprising methacrylamidopropyl-functional siloxanes compared to the methacrylamidosilane according to the prior art.

The test product, a methacrylamidopropyl-functional siloxane without free acrylic acid, was tested in an SPU formulation compared to the methacrylamido monomer Silquest Y 5997. Distinct advantages were found here in the reactivity in the tested sealant formulation, as were higher tensile strengths of the cured sealant. The adhesion testing led to significantly higher shear strengths on the tested substrates.

TABLE 7

| Active ingredient | Shear strength [N/mm$^2$] on aluminium | Shear strength [N/mm$^2$] on PMMA |
| --- | --- | --- |
| Methacrylamidopropylsiloxane | 3.38 | 1.14 |
| Y 5997 | 2.0 | 0.78 |

The base system chosen was an SPU sealant in which the active ingredients, the inventive methacrylamidopropyl-functional siloxane and the Y 5997 silane, were mixed in as adhesion promoters, each at 1% by weight (Table 8).

TABLE 8

| Formulation constituents of SPU sealant |
| --- |
| 36% by weight of silane-terminated polyurethane polymer (SPU) |
| 14.5% by weight of diisodecyl phthalate, plasticizer |
| 46.9% by weight of precipitated chalk |
| 1.5% by weight of vinyltrimethoxysilane, water scavenger |
| 1% by weight of active ingredients (methacrylamidopropyl-functional siloxane and alternatively Y 5997 silane) as adhesion promoter |
| 0.1% by weight of TIB KAT 226, tin catalyst |

Testing was effected by the production of test strips, out of which test dumbbells were punched after full curing (tensile strength, elongation at breaking strength). Overlap bonds of identical substrates were produced as follows:

Test area: width: 2 cm, length: 3 cm
Substrates: aluminium, PMMA
Determination of the shear strengths with tensile testing machine after full curing under standard climatic conditions: 23° C., 50% rel. humidity for 14 days (DIN EN ISO 527).

The overall result was that the inventive siloxane system exhibits a much quicker skin formation time, full curing (10 mm) is considerably quicker, and it has the highest strengths with acceptable elongation at break compared to Y 5997.

The performance testing in Table 7 shows convincingly that the inventive siloxane system attains better shear strengths on both substrates tested. The shear strengths found on aluminium were limited here by the internal strength of the sealant (cohesive fracture). On the critical PMMA substrate, all the sealant compounds exhibited cohesive fracture, and so it was not the internal strength of the sealant that was crucial for the shear strengths here, but rather solely the effect of the adhesion promoter. The sealant compound based on the inventive methacrylamido-functional siloxane system exhibited a significantly higher value here of +46.2% compared to Silquest Y 5997.

The inventive silane system results in good reactivity in this sealant compound formulation, and leads to good internal strengths of this SMP (silane-modified polymer). On the basis of these test results, good performance of the inventive compositions is achieved in hybrid systems such as silane-terminated polyurethanes.

EXAMPLE 3

A 1 l stirred apparatus with distillation system was initially charged with 400.26 g of N-[3-(trimethoxysilyl)propyl]ethylenediamine (1.8 mol), and 80.90 g of methanol were stirred in. Subsequently, 25.91 g of demineralized water were added while stirring within 4 minutes, and the mixture was stirred at 59-61° C. for a further 1 hour. After cooling to bottom temperature 29° C., 92.63 g of methacrylic anhydride (0.6 mol) were metered in within 40 minutes. In the course of this, the bottom temperature rose to 54° C. 0.41 g of 4-hydroxy-tempo was added to the bottoms as an additional stabilizer (prior to the addition of methacrylic anhydride). Subsequently, free methanol is distilled off at an absolute pressure of 216 mbar and a bottom temperature of about 40° C. At the end of the distillation, the absolute pressure is 1 mbar and the bottom temperature is 20° C. The amount of distillate is 147.5 g.

Yield: 441.8 g of clear colourless liquid

The product dissolves spontaneously in water; see Table 10.

TABLE 9

| Analysis results for Example 3 |  |  |
| --- | --- | --- |
| Determination | Method | Result |
| Total N [%] | see above | 10.7 |
| Solids content [%] | 3 g/12 hours/125° C. | 77.3 |
| SiO2 content [%] | AN-SAA 1171 | 24.0 |
| pH | DIN ISO 4925 | 9.9 |
| Density [g/cm$^3$] | DIN 51757 | 1.110 |
| Viscosity [mPa · s] | DIN 53015 | 5000 |
| Methanol after hydrolysis [%] | Based on SAA0272 | 27 (= max. VOC content) |
| 1H and 13C NMR | 1 mol of Si—OCH3 is present per mole of Si. Oligomeric mixture of about 30 mol % of primary amide and about 30 mol % of secondary amide. | |

TABLE 10

| Overview of solubility tests for Example 3 | | | | |
| --- | --- | --- | --- | --- |
| Hydrolysate | | | | |
| w(bottom product) | w(H2O) | | Turbidity [FNU] | |
| [%] | [%] | pH | 1 min. | 24 hours |
| 6 | 97 | 9.6 | 0.5 (clear) | 0.8 (clear) |
| 12 | 90 | 9.1 | 2.3 (clear) | 1.8 (clear) |
| Hydrolysate | | | | |
| w(bottom product) | w(0.5% acetic acid) | | Turbidity [FNU] | |
| [%] | [%] | pH | 1 min. | 24 hours |
| 6 | 97 | 6.4 | 0.5 (clear) | 0.7 (clear) |
| 12 | 90 | 5.6 | 1.5 (clear) | 1.8 (clear) |

The invention claimed is:

1. A composition, comprising an acrylamido-functional siloxane obtained by a process comprising:
   a) reacting a component A which is an aininoalkyl-functionalized silicon compound selected from the group consisting of (i), (ii) and (iii)
   (i) an aminoalkyl-functional alkoxysilane or a mixture of aminoalkyl-functional alkoxysilanes, each in the presence of a defined amount of water,
   (ii) a hydrolysis or condensation product of at least one aminoalkyl-functional alkoxysilane, and
   (iii) a mixture comprising an aminoalkyl-functional alkoxysilane and a hydrolysis and/or condensation product of at least one aminoalkyl-functional alkoxysilane,
   with a component B which is an acrylic anhydride, optionally in the presence of a diluent; and optionally
   b) removing a portion of the diluent and/or an alcohol of hydrolysis,
   wherein:
   the aminoalkyl-functional alkoxysilane is represented by formula:

$(R^1O)_3Si(B)$;

B independently represents a group of formula (II) or independently represents a group of formula (III):

$-(CH_2)_c-[(NH)(CH_2)_d]_e[(NH)(CH_2)_f]_gNH_{(2-h)}R^3_h$ (II), $-(CH_2)_f-NH_{2-p}(CH_2-CH_2-NH_2)_p$ (III);

each $R^1$ is independently a linear, branched or cyclic alkyl group having 1 to 8 carbon atoms;
   each $R^2$ is independently a linear, branched or cyclic alkyl group having 1 to 8 carbon atoms;
   each $R^3$ is independently a linear, branched or cyclic alkyl, aryl or alkylaryl group having 1 to 8 carbon atoms;
   c is independently selected from the group consisting of 1, 2, 3, 4, 5 and 6;
   d is independently selected from the group consisting of 1, 2, 3, 4, 5 and 6;
   e is independently selected from the group consisting of 0, 1, 2, 3, 4, 5 and 6;
   f is independently selected from the group consisting of 1, 2, 3, 4, 5 and 6;
   g is independently selected from the group consisting of 0, 1, 2, 3, 4, 5 and 6;
   h is independently 0 or 1;
   j represents 1, 2 or 3;
   p represents 0, 1 or 2;
   the acrylic anhydride is represented by formula (IV):

$(CHR^5=CR^4CO)_2O$ (IV);

each $R^4$ is independently a hydrogen atom or a methyl group; and
   each $R^5$ is independently a hydrogen atom or a methyl group.

2. The composition of claim 1 wherein:
   the acrylamido-functional siloxane is represented by formula:

$(R^1O)[(R^1O)Si(C)O]_u[(Y)Si(C)O]_{u'}R^1 \cdot (HX)_z$;

C corresponds to an acrylamido group;
   Y corresponds to $OR^1$ or, in crosslinked and/or three-dimensionally crosslinked structures, independently to $OR^1$ or $O_{1/2}$;
   each $R^1$ independently corresponds to a linear, branched or cyclic alkyl group having 1 to 8 carbon atoms, or optionally at least partly corresponds to hydrogen;
   each $R^2$ corresponds to a linear, branched or cyclic alkyl group having 1 to 8 carbon atoms;
   HX is an acid, where X is an inorganic or organic acid radical;
   u is independently an integer greater than or equal to 2;
   u' is greater than or equal to 0;
   z is greater than or equal to 0;
   $(u+u') \geq 2$; and
   the composition is essentially free of diluents.

3. A process for preparing the composition of claim 1, the process comprising:
   reacting the component A
   with the component B; and
   optionally at least partly removing the diluent and the alcohol of hydrolysis formed in the reaction,
   wherein the reacting, the removing, or both, are performed in the presence of water.

4. The process of claim 3, wherein in the aminoalkyl-functional alkoxysilane:
   a) $R^1$ is independently methyl or ethyl, c=1, 2 or 3, and in group B of the formula II, g=0, e=1, h=0, and d=1, 2, or 3; or
   b) $R^1$ is independently methyl or ethyl, c=3, and in group B of the formula II, g, e and h are each 0 or, alternatively, c=3, and in group B of the formula II, e=1, d=1, 2, or 3, g=0, h=0, or in group B of the formula II, e=g=0 or 1, d=f=2 or 3, h=0, and c=3, or in group B of the formula III, j=3 and p=1 or 2; or
   c) $R^1$ is independently methyl or ethyl, c=2, and in group B of the formula II, g, e and h are each 0 or, alternatively, c=3, and in group B of the formula II, e=1, d=1, 2, or 3, g=0, h=0, or in group B of the formula II, e=g=0 or 1, d=f=2 or 3, h=0, and c=2, or in group B of the formula III, j=3 and p=1 or 2; or
   d) $R^1$ is independently methyl or ethyl, c=1, and in group B of the formula II, g, e and h are each 0 or, alternatively, c=3, and in group B of the formula II, e=1, d=1, 2, or 3, g=0, h=0, or in group B of the formula II, e=g=0 or 1, d=f=2 or 3, h=0 and c=1, or in group B of the formula III, j=3 and p=1 or 2.

5. The process of claim 3, wherein the aminoalkyl-functional alkoxysilane of the formula I is selected from the group consisting of 3-aminopropyl trimethoxysilane, 3-aminopropyltriethoxysilane, 1-aminomethyltrimethoxysilane, 1-aminomethyl triethoxysilane, 2-aminoethyltrimethoxysilane, 2-aminoethyltriethoxysilane, 3-aminoisobutyl trimethoxysilane, 3-aminoisobutyltriethoxysilane, N-n-butyl-3-aminopropyltriethoxysilane, N-n-butyl-3-aminopropyltrimethoxysilane, N-n-butyl-1-aminomethyltriethoxysilane, N-n-butyl-1-aminomethyltrimethoxysilane, N-n-butyl-1-aminomethylmethyltriethoxysilane, benzyl-3-aminopropyltrimethoxysilane, benzyl-3-aminopropyltriethoxysilane, benzyl-2-aminoethyl-3-aminopropyltrimethoxy silane, benzyl-2-aminoethyl-3-aminopropyltriethoxysilane, diaminoethylene-3-propyl trimethoxysilane, diaminoethylene-3-propyltriethoxysilane, triaminodiethylene-3-propyl trimethoxysilane, triaminodiethylene-3-propyltriethoxysilane, (2-arninoethylamino) ethyltrimethoxysilane, (2-aminoethylarnino)ethyltriethoxysilane, (1-aminoethylamino) methyltrimethoxysilane and (1-aminoethylamino)methyltriethoxysilane.

6. The process of claim 3, wherein the acrylic anhydride of the formula IV is methacrylic anhydride or (unsubstituted) acrylic anhydride.

7. The process of claim 3, wherein the water is present in an amount of 0.1 to 4.5 mol of water per mole of silicon atoms in the aminoalkyl-functional silicon.

8. The process of claim 3, wherein a defined amount of the water is established prior to the reacting.

9. The process of claim 3, further comprising:

(Ia)

admixing the component A according to (i) with a defined amount of water, optionally at least partly removing alcohol of hydrolysis and/or added diluent, adding the acrylic anhydride of the formula IV to the resulting mixture, optionally adding a stabilizer to the mixture, or alternatively (Ib)

reacting the component A according to (ii) or (iii), optionally in a mixture with a diluent, with acrylic anhydride of the formula IV, optionally adding a stabilizer to the mixture, and (IIa)

in one alternative, after (Ia) or (Ib), optionally at least partly removing the added diluent and any alcohol of hydrolysis formed and optionally water formed in the reaction under ambient or reduced pressure and elevated temperature, or (IIb)

in a further alternative, after (Ia) or (Ib), adding a base to the mixture, optionally removing the precipitate, and adding an organic acid and at least partly removing the alcohol of hydrolysis and/or the diluent.

10. The process of claim 3, wherein a molar ratio of nitrogen atoms in the aminoalkyl-functional silicon compound to a molar ratio of an acryloylcarbonyl functional group released from the acrylic anhydride of the formula IV is in a range from 1:5 to 5:1.

11. The process of claim 3, wherein an active ingredient content of acrylamido-functional siloxanes in the overall composition is adjusted to 0.0001 to 99.9% by weight.

12. The process of claim 3, wherein volatile diluents and alcohol of hydrolysis are removed down to a content in the overall composition of less than or equal to 12% by weight to 0% by weight.

13. The process of claim 3, wherein the acrylamidoalkyl-functional silanes are removed by distillation.

14. A composition obtained by the process of claim 3.

15. A formulation,. comprising the composition of claim 1 and at least one further formulation constituent selected from the group consisting of an auxiliary, water, a polymer, a diluent, an additive, a pigment, a filler, an acid, a base and a buffer.

16. An adhesion promoter, comprising the composition of claim 1.

17. The composition of claim 1, wherein the aminoalkyl-functional alkoxysilane is selected from the group consisting of 3-aminopropyl trimethoxy silane, 3-aminopropyltriethoxysilane, 1-aminomethyltrimethoxysilane, 1-aminomethyl triethoxysilane, 2-aminoethyltrimethoxysilane, 2-aminoethyltriethoxysilane, 3-aminoisobutyl trimethoxysilane, 3-aminoisobutyltriethoxysilane, N-n-butyl-3-aminopropyl triethoxysilane, N-n-butyl-3-aminopropyltrimethoxysilane, N-n-butyl-1-aminomethyltriethoxysilane, N-n-butyl-1-aminomethyltrimethoxy silane, N-n-butyl-1-aminomethylmethyltriethoxysilane, benzyl-3-aminopropyltrimethoxy silane, benzyl-3-aminopropyltriethoxysilane, benzyl-2-aminoethyl-3-aminopropyltrimethoxy silane, benzyl-2-aminoethyl-3-aminopropyltriethoxy silane, diaminoethylene-3-propyl trimethoxysilane, diaminoethylene-3-propyltriethoxysilane, triaminodiethylene-3-propyl trimethoxysilane, triaminodiethylene-3-propyltriethoxysilane, (2-aminoethylamino) ethyltrimethoxysilane, (2-aminoethylarnino)ethyltriethoxysilane, (1-aminoethylamino) methyltrimethoxysilane and (1-minoethylamino)methyltriethoxysilane.

18. The composition of claim 1, wherein water is present in the process in an amount of 0.1 to 4.5 mol of water per mole of silicon atoms in the aminoalkyl-functional silicon.

* * * * *